US009175784B2

(12) United States Patent
Diekmeyer et al.

(10) Patent No.: US 9,175,784 B2
(45) Date of Patent: Nov. 3, 2015

(54) VALVE

(75) Inventors: Heinrich Diekmeyer, Barsinghausen (DE); Christoph Wilken, Salzbergen (DE)

(73) Assignee: WABCO GmbH, Hannover (DE)

(*) Notice: Subject to any disclaimer, the term of this patent is extended or adjusted under 35 U.S.C. 154(b) by 306 days.

(21) Appl. No.: 13/000,664

(22) PCT Filed: Feb. 27, 2009

(86) PCT No.: PCT/EP2009/001398
§ 371 (c)(1),
(2), (4) Date: Feb. 22, 2011

(87) PCT Pub. No.: WO2010/000345
PCT Pub. Date: Jan. 7, 2010

(65) Prior Publication Data
US 2011/0140028 A1  Jun. 16, 2011

(30) Foreign Application Priority Data
Jun. 30, 2008  (DE) .................. 10 2008 031 024

(51) Int. Cl.
*F16K 31/122*  (2006.01)
(52) U.S. Cl.
CPC .................. *F16K 31/122* (2013.01)
(58) Field of Classification Search
CPC ....................................... F16K 31/122
USPC ............................. 251/62, 63, 63.5
See application file for complete search history.

(56) References Cited

U.S. PATENT DOCUMENTS

| | | | | | |
|---|---|---|---|---|---|
| 2,617,640 | A | * | 11/1952 | Hieger | 261/69.1 |
| 2,696,197 | A | * | 12/1954 | Forwald | 91/172 |
| 3,064,675 | A | * | 11/1962 | Johnson et al. | 137/489.5 |
| 3,410,304 | A | * | 11/1968 | Paul, Jr. | 137/494 |
| 3,424,427 | A | * | 1/1969 | Ruchser | 251/30.02 |
| 3,658,082 | A | * | 4/1972 | DiTirro | 137/116.5 |
| 4,613,111 | A | * | 9/1986 | Paquet et al. | 251/46 |
| 4,615,354 | A | * | 10/1986 | Bianchi | 137/110 |
| 4,817,660 | A | * | 4/1989 | Deike et al. | 137/115.19 |
| 5,664,759 | A | * | 9/1997 | Evans et al. | 251/63.5 |
| 6,764,058 | B1 | * | 7/2004 | Brenk et al. | 251/54 |
| 7,727,313 | B2 | | 6/2010 | Blackwood et al. | |
| 2010/0059126 | A1 | | 3/2010 | Diekmeyer et al. | |

FOREIGN PATENT DOCUMENTS

| | | |
|---|---|---|
| DE | 1 151 702 | 7/1963 |
| DE | 11 2005 002 633 | 9/2007 |
| DE | 10 2006 035 772 | 2/2008 |
| FR | 1 346 796 | 12/1963 |

\* cited by examiner

*Primary Examiner* — Kevin Murphy
*Assistant Examiner* — Daphne M Barry
(74) *Attorney, Agent, or Firm* — Kramer Levin Naftalis & Frankel LLP

(57) ABSTRACT

A valve includes at least one inlet chamber and at least one outlet chamber that can be connected to each other or blocked from each other by means of an actuator. A control chamber is provided for controlling the actuator. The control chamber is divided into a first chamber and a second chamber that are connected to each other.

24 Claims, 3 Drawing Sheets

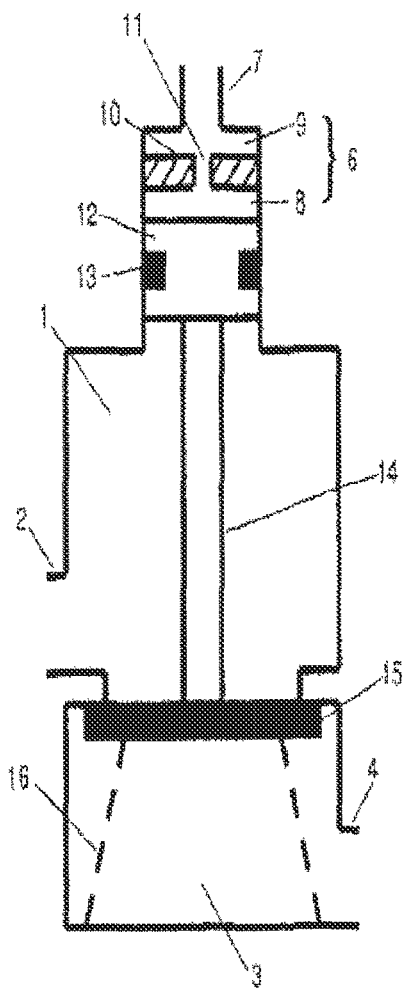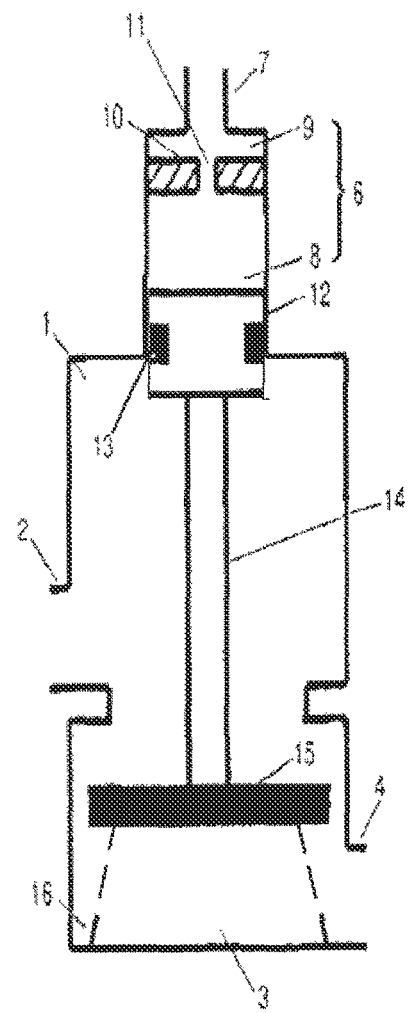

VALVE

FIELD OF THE INVENTION

The invention relates generally to embodiments of a valve.

BACKGROUND OF THE INVENTION

A valve of the general type under consideration, which may be in the form of, for example, a 2/2-way valve, can be used, for example, for controlling the flow of pressure medium between a pressure medium source and a pressure medium sink. For this purpose, an inlet chamber of the valve is connected via an inlet connection to the pressure medium source and an outlet chamber of the valve is connected via an outlet connection to the pressure medium sink. The valve has a positioning device by which the inlet chamber can be connected to or shut off from the outlet chamber. In the through-flow position the inlet chamber is connected to the outlet chamber and the pressure medium source is therefore connected to the pressure medium sink. In the shut-off position the inlet chamber is disconnected from the outlet chamber and the pressure medium source is therefore disconnected from the pressure medium sink.

The positioning device is usually embodied as a piston. The control of the piston is effected by means of a control chamber, which can be subjected to the pressure medium. The pressure medium can act on the piston via a control face of the piston and thus bring about a movement of the piston. In a configuration of such a valve, which is also referred to as normally closed, the valve is in the shut-off position when the control chamber has been vented. The piston is preloaded by a spring such that the pressure medium cannot flow from the inlet chamber into the outlet chamber. In order to transfer the valve from the shut-off position to the through-flow position, pressurization of the control chamber with the pressure medium is required. During pressurization of the control chamber the pressure medium acts on a control face of the piston, whereby the piston is moved against the force of the spring and therefore opens the path between the inlet chamber and the outlet chamber, so that the pressure medium can flow from the inlet chamber to the outlet chamber.

During pressurization of the control chamber with the pressure medium, the problem can arise that the piston is set into oscillation caused by the activation with the pressure medium, since the piston, in combination with the spring, represents an oscillatory system. This oscillation is undesirable because, firstly, it can cause noise and, secondly, it can even lead to destruction of the valve.

SUMMARY OF THE INVENTION

Generally speaking, it is an object of the invention to provide a valve in which oscillation of the piston or positioning device caused by activation with the pressure medium is avoided.

In accordance with embodiments of the invention, the control chamber is divided into a first chamber and a second chamber, the first chamber being connected to the second chamber. The division of the control chamber leads to a velocity-dependent damping of the movement of the positioning device during pressurization of the control chamber with the pressure medium. The damping is achieved by two effects. Firstly, the pressure medium is braked as it passes from the first to the second chamber. The pressure medium therefore does not act with its full energy on the control face of the positioning device, as in the case of a unitary control chamber. Secondly, as the positioning device moves, an underpressure is produced in the second chamber, since a pressure equalization between the first and second chambers cannot take place correspondingly quickly. The underpressure exerts a force on the positioning device that opposes the movement.

Through the above-described damping, oscillation of the positioning device is prevented. The inventive embodiments therefore enable low-noise and robust valves to be implemented.

Still other objects and advantages of the present invention will in part be obvious and will in part be apparent from the specification.

The present invention accordingly comprises the features of construction, combination of elements, and arrangement of parts all as exemplified in the constructions herein set forth, and the scope of the invention will be indicated in the claims.

BRIEF DESCRIPTION OF THE DRAWING

Exemplary embodiments of the present invention are explained in more detail hereinafter with reference to the appended drawings, in which:

FIG. 3 shows a cross section of a valve in a first state according to a further embodiment of the present invention; and FIG. 3a shows a cross section of the valve of FIG. 3 in a second state.

DETAILED DESCRIPTION OF THE PREFERRED EMBODIMENTS

Figure 1:
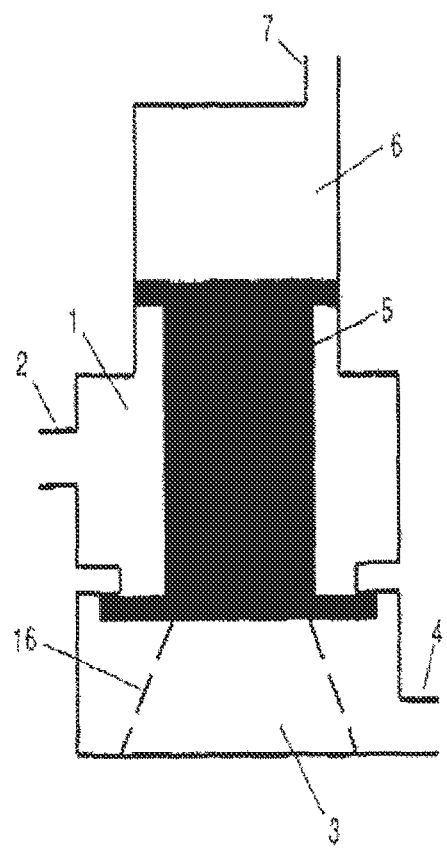
FIG. 1 shows a cross section of a valve known from the prior art.

FIG. 1 depicts a conventional valve in cross-section. The valve is used to control the flow of pressure medium between an inlet connection 2 and an outlet connection 4. For this purpose a pressure medium source may, for example, be connected to the input connection 2 and the outlet connection 4 may be connected to a consumer. An inlet chamber 1 can be connected to or disconnected from an outlet chamber 3 by a positioning device 5. In the position shown in FIG. 1, the inlet chamber 1 is disconnected from the outlet chamber 3, so that the pressure medium cannot flow from the inlet connection 2 to the outlet connection 4.

Control of the positioning device 5, which is embodied as a piston 5, is effected via a control chamber 6. In order to control the positioning device 5, the control chamber 6 can be connected via a control chamber connection 7 to a pressure medium source or to a pressure medium sink. The position of the valve shown in FIG. 1 corresponds to a connection of the control chamber 6 to a pressure medium sink; The control chamber 6 is vented. The valve is in its shut-off position, since the positioning device 5 is preloaded by a spring 16 such that the pressure medium cannot flow from the inlet chamber 1 into the outlet chamber 3.

In order to transfer the valve from the shut-off position to the through-flow position, pressurization of the control chamber 6 with the pressure medium is required; that is, the control connection 7 of the control chamber 6 is connected to a pressure source. During pressurization of the control chamber 6 with the pressure medium, the pressure medium acts on a control face of the positioning device 5, whereby the positioning device 5 is moved against the force of the spring 16 and therefore opens the path between the inlet chamber 1 and the outlet chamber 3, so that the pressure medium can flow from the inlet chamber 1 to the outlet chamber 3.

During pressurization of the control chamber 6 with the pressure medium, the problem can arise that the positioning device 5 is set into oscillation caused by the activation with the pressure medium, since the positioning device 5, in combination with the spring 16, represents an oscillatory system. This oscillation is undesirable since, firstly, it can cause noise and, secondly, it can even lead to destruction of the valve.

Figure 2:
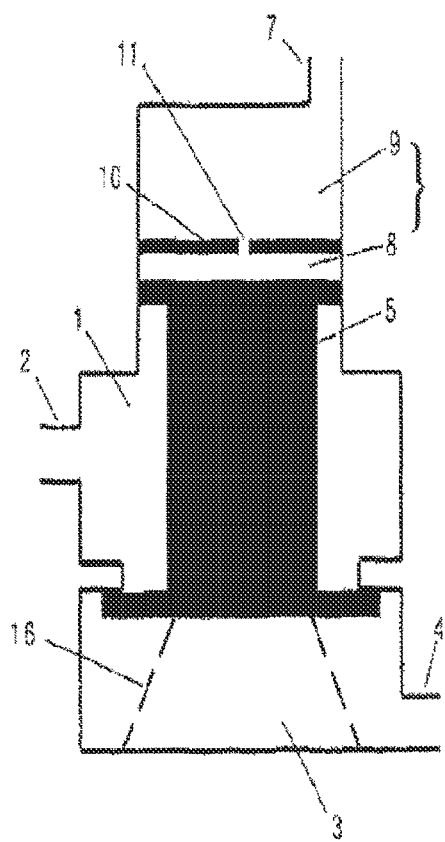
FIG. 2 shows a cross section of a valve in a first state according to an embodiment of the present invention.

FIG. 2 shows a cross section of a valve according to an embodiment of the present invention. The fundamental operation of the valve corresponds to the operation described above of the valve shown in FIG. 1, so that a separate description of the fundamental operation is not necessary. According to the depicted embodiment of the invention, the control chamber 6 of the valve is divided into a first chamber 9 and a second chamber 8. The division of the control chamber is effected by means of a screen 10. The first chamber 9 is connected to the second chamber 8 via an aperture 11 of the screen 10. The screen 10 and the aperture 11 of the screen 10 are dimensioned such that they act as a throttle 10, 11. The effect of the throttle 10, 11 is such that, upon pressurization of the first chamber 9 with the pressure medium, the compressed air flowing into the first chamber 9 enters the second chamber 8 in a throttled manner, so that oscillation of the positioning device 5 is avoided.

In order to control the positioning device 5, the first chamber 9 can be connected to a pressure medium source or to a pressure medium sink. In order to move the valve from its shut-off position shown in FIG. 2 to the through-flow position, the first chamber 9 is subjected to the pressure medium. The pressure medium reaches the second chamber 8 from the first chamber 9 via the aperture 11 of the screen 10. The pressure medium, which has thus entered the second chamber 8, acts on the control face of the positioning device 5 and thus causes an actuation of the valve from the shut-off to the through-flow position. The volume of the first chamber 9 is independent of the position of the positioning device 5, whereas the volume of the second chamber 8 depends on the position of the positioning device. In the through-flow position of the valve the volume of the second chamber 8 is larger than in the shut-off position of the valve.

Figure 2A:
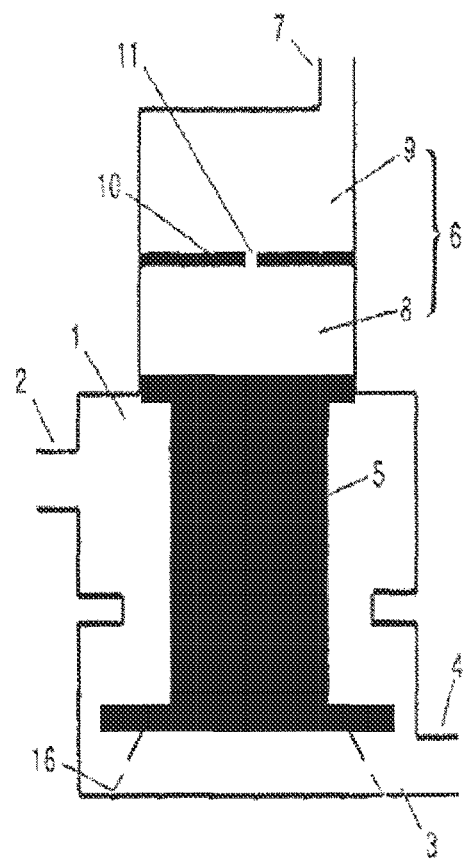
FIG. 2a shows a cross section of the valve of FIG. 2 in a second state.

The division of the control chamber 6 brings about a velocity-dependent damping of the movement of the positioning device 5 during pressurization of the control chamber 6 with the pressure medium. The damping is achieved by two effects. Firstly, the pressure medium is braked as it passes from the first chamber 9 to the second chamber 8. The pressure medium therefore does not act with its full energy on the control face of the positioning device 5, as with a unitary control chamber 6. Secondly, during a movement of the positioning device 5, which is greater than is necessary to equalize the forces between the gas force and the spring force (oscillation case), an underpressure is produced in the second chamber 8, since the movement of the positioning device 5 causes an increase in the volume of the second chamber 8 (as shown in FIG. 2*a*) and a pressure equalization between the first chamber 9 and the second chamber 8 cannot take place correspondingly rapidly. The underpressure exerts a force on the positioning device 5, which opposes the movement.

The above-described damping prevents oscillation of the positioning device 5. Therefore, low-noise and robust valves can be implemented.

Advantageously, the two chambers 8, 9 are configured such that the volume of the second chamber 8 is smaller than that of the first chamber 9. Oscillation of the positioning device 5 is prevented especially effectively by these configurations.

To assist the avoidance of oscillation of the positioning device 5, the positioning device 5 can additionally have a stepped configuration in the region of the outlet chamber 3; that is, the positioning device 5 can be stepped on its side opposite its control face.

FIG. 3 shows an embodiment of the inventive valve that can be used in gas or air dryers as a vent or discharge valve. As compared to the valves shown in FIG. 1 and FIG. 2, the positioning device 5 is implemented not by a one-piece piston 5 but by a piston head 12, which is provided with a circumferential seal 13 and is connected to a pressure plate 15 by means of a piston rod 14. Similar to the valve embodiment described above with respect to FIGS. 2 and 2*a*, the movement of piston head 12 can cause an increase in the volume of second chamber 8, as shown in FIG. 3*a*.

An air dryer for a vehicle compressed air system in which the valve according to FIG. 3 can be used is described in DE 11 2005 002 633 T5. In this document the vent or discharge valve is referred to as a purge valve, which is denoted by reference numeral 22. The purge valve is described, in particular, in paragraphs [0024] and [0030] of DE 11 2005 002 633 T5. According to FIGS. 1 to 3 and paragraph [0024] of this document, the control chamber of the purge valve is formed by a cylindrical section of the body, the cylindrical section being denoted by reference numeral 62 and the body by reference numeral 12 in this document. According to the inventive embodiment of the present application, the cylindrical section of the body, and therefore the control chamber of the purge valve, is divided into two chambers.

Further examples of components/devices in which the valve according to embodiments of the invention can be used include pressure regulators or compressed air supply devices for motor vehicles. Such a compressed air supply device is disclosed, for example, in DE 10 2006 035 772 A1.

It will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A valve, comprising at least one inlet chamber and at least one outlet chamber, a positioning device one of (i) connecting the at least one inlet chamber and the at least one outlet chamber and (ii) shutting off the at least one inlet chamber from the at least one outlet chamber; a spring configured to preload the positioning device; and a control chamber for controlling the positioning device, the control chamber being divided into a first chamber and a second chamber, the first chamber and the second chamber being connected to one another, the first chamber being configured to couple to a pressure medium source, and both the spring and the positioning device being disposed external to the first chamber, wherein the volume of the first chamber is independent of the position of the positioning device, and wherein the positioning device is controllable to displace within the at least one inlet chamber and the at least one outlet chamber such that, when the positioning device travels in a direction from the at least one inlet chamber to the at least one outlet chamber, the volume of the second chamber increases as the volume of the at least one inlet chamber decreases.

2. The valve as claimed in claim 1, wherein a throttle connects the first chamber and the second chamber.

3. The valve as claimed in claim 2, wherein the throttle is dimensioned so as to avoid oscillation of the positioning device during pressurization of the first chamber.

4. The valve as claimed in claim 1, wherein the control chamber pressurizes to effect movement of the positioning device in the direction from the at least one inlet chamber to the at least one outlet chamber, and wherein compression of the spring increases when the positioning device travels in the direction.

5. The valve as claimed in claim 1, wherein a screen divides the control chamber into the first and second chambers.

6. The valve as claimed in claim 5, wherein the screen includes an aperture that functions as a throttle.

7. The valve as claimed in claim 6, wherein the screen and the aperture are dimensioned so as to avoid oscillation of the positioning device during pressurization of the first chamber.

8. The valve as claimed in claim 6, wherein the aperture is positioned proximate the center of the screen.

9. The valve as claimed in claim 5, wherein the periphery of the screen couples to an inner surface of the control chamber.

10. The valve as claimed in claim 1, wherein the volume of the first chamber is less than the volume of the second chamber when the valve is in a through-flow position.

11. The valve as claimed in claim 1, wherein the volume of the first chamber is greater than the volume of the second chamber when the valve is in a shut-off position.

12. The valve as claimed in claim 1, wherein the positioning device is a piston.

13. The valve as claimed in claim 1, wherein the positioning device is stepped in the region of the at least one outlet chamber.

14. The valve as claimed in claim 1, wherein the second chamber is connectable to the at least one outlet chamber only via the at least one inlet chamber.

15. A gas dryer, comprising a valve, the valve, comprising: at least one inlet chamber and at least one outlet chamber, a positioning device one of (i) connecting the at least one inlet chamber and the at least one outlet chamber and (ii) shutting off the at least one inlet chamber from the at least one outlet chamber; a spring configured to preload the positioning device; and a control chamber for controlling the positioning device, the control chamber being divided into a first chamber and a second chamber, the first chamber and the second chamber being connected to one another, the first chamber being configured to couple to a pressure medium source, and both the spring and the positioning device being disposed external to the first chamber, wherein the volume of the first chamber is independent of the position of the positioning device, and wherein the positioning device is controllable to displace within the at least one inlet chamber and the at least one outlet chamber such that, when the positioning device travels in a direction from the at least one inlet chamber to the at least one outlet chamber, the volume of the second chamber increases as the volume of the at least one inlet chamber decreases.

16. The gas dryer as claimed in claim 15, wherein the control chamber pressurizes to effect movement of the positioning device in the direction from the at least one inlet chamber to the at least one outlet chamber, and wherein compression of the spring increases when the positioning device travels in the direction.

17. A pressure regulator, comprising a valve, the valve, comprising: at least one inlet chamber and at least one outlet chamber, a positioning device one of (i) connecting the at least one inlet chamber and the at least one outlet chamber and (ii) shutting off the at least one inlet chamber from the at least one outlet chamber; a spring configured to preload the positioning device; and a control chamber for controlling the positioning device, the control chamber being divided into a first chamber and a second chamber, the first chamber and the second chamber being connected to one another, the first chamber being configured to couple to a pressure medium source, and both the spring and the positioning device being disposed external to the first chamber, wherein the volume of the first chamber is independent of the position of the positioning device, and wherein the positioning device is controllable to displace within the at least one inlet chamber and the at least one outlet chamber such that, when the positioning device travels in a direction from the at least one inlet chamber to the at least one outlet chamber, the volume of the second chamber increases as the volume of the at least one inlet chamber decreases.

18. The pressure regulator as claimed in claim 17, wherein the control chamber pressurizes to effect movement of the positioning device in the direction from the at least one inlet chamber to the at least one outlet chamber, and wherein compression of the spring increases when the positioning device travels in the direction.

19. A compressed air supply device, comprising a valve, the valve, comprising: at least one inlet chamber and at least one outlet chamber, a positioning device one of (i) connecting the at least one inlet chamber and the at least one outlet chamber and (ii) shutting off the at least one inlet chamber from the at least one outlet chamber; a spring configured to preload the positioning device; and a control chamber for controlling the positioning device, the control chamber being divided into a first chamber and a second chamber, the first chamber and the second chamber being connected to one another, the first chamber being configured to couple to a pressure medium source, and both the spring and the positioning device being disposed external to the first chamber, wherein the volume of the first chamber is independent of the position of the positioning device, and wherein the positioning device is controllable to displace within the at least one inlet chamber and the at least one outlet chamber such that, when the positioning device travels in a direction from the at least one inlet chamber to the at least one outlet chamber, the volume of the second chamber increases as the volume of the at least one inlet chamber decreases.

20. The compressed air supply device as claimed in claim 19, wherein the control chamber pressurizes to effect movement of the positioning device in the direction from the at least one inlet chamber to the at least one outlet chamber, and wherein compression of the spring increases when the positioning device travels in the direction.

21. A compressed-air operated vehicle brake system, comprising a valve, the valve, comprising: at least one inlet chamber and at least one outlet chamber, a positioning device one of (i) connecting the at least one inlet chamber and the at least one outlet chamber and (ii) shutting off the at least one inlet chamber from the at least one outlet chamber; a spring configured to preload the positioning device; and a control chamber for controlling the positioning device, the control chamber being divided into a first chamber and a second chamber, the first chamber and the second chamber being connected to one another, the first chamber being configured to couple to a pressure medium source, and both the spring and the positioning device being disposed external to the first chamber, wherein the volume of the first chamber is independent of the position of the positioning device, and wherein the positioning device is controllable to displace within the at least one inlet chamber and the at least one outlet chamber such that, when the positioning device travels in a direction from the at least one inlet chamber to the at least one outlet chamber, the volume of the second chamber increases as the volume of the at least one inlet chamber decreases.

22. The compressed-air operated vehicle brake system as claimed in claim 21, wherein the control chamber pressurizes to effect movement of the positioning device in the direction from the at least one inlet chamber to the at least one outlet chamber, and wherein compression of the spring increases when the positioning device travels in the direction.

23. A pneumatic vehicle suspension system, comprising a valve, the valve, comprising: at least one inlet chamber and at least one outlet chamber, a positioning device one of (i) connecting the at least one inlet chamber and the at least one outlet chamber and (ii) shutting off the at least one inlet chamber from the at least one outlet chamber; a spring configured to preload the positioning device; and a control chamber for controlling the positioning device, the control chamber being divided into a first chamber and a second chamber, the first chamber and the second chamber being connected to one another, the first chamber being configured to couple to a pressure medium source, and both the spring and the positioning device being disposed external to the first chamber, wherein the volume of the first chamber is independent of the position of the positioning device, and wherein the positioning device is controllable to displace within the at least one inlet chamber and the at least one outlet chamber such that, when the positioning device travels in a direction from the at least one inlet chamber to the at least one outlet chamber, the volume of the second chamber increases as the volume of the at least one inlet chamber decreases.

24. The pneumatic vehicle suspension system as claimed in 23, wherein the control chamber pressurizes to effect movement of the positioning device in the direction from the at least one inlet chamber to the at least one outlet chamber, and wherein compression of the spring increases when the positioning device travels in the direction.

* * * * *